United States Patent
Cho et al.

(10) Patent No.: US 12,210,097 B2
(45) Date of Patent: Jan. 28, 2025

(54) LIDAR APPARATUS HAVING WIDE-VIEWING ANGLE

(71) Applicant: SAMSUNG ELECTRONICS CO., LTD., Suwon-si (KR)

(72) Inventors: Yongchul Cho, Suwon-si (KR); Jungwoo Kim, Hwaseong-si (KR); Tatsuhiro Otsuka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1001 days.

(21) Appl. No.: 17/192,493

(22) Filed: Mar. 4, 2021

(65) Prior Publication Data

US 2022/0113406 A1    Apr. 14, 2022

(30) Foreign Application Priority Data

Oct. 12, 2020    (KR) .................. 10-2020-0131292

(51) Int. Cl.
  G01S 17/02    (2020.01)
  G01S 7/481    (2006.01)
  (Continued)

(52) U.S. Cl.
  CPC .............. G01S 17/02 (2013.01); G01S 7/481 (2013.01); G01S 7/484 (2013.01); G02B 26/0816 (2013.01)

(58) Field of Classification Search
  CPC ............................ G02B 26/00; G01S 7/4815
  See application file for complete search history.

(56) References Cited

U.S. PATENT DOCUMENTS 10,466,371 B2 * 11/2019 Zhang ............... A61B 6/037
10,768,346 B2    9/2020 Miner et al.
(Continued)

FOREIGN PATENT DOCUMENTS

EP    3 203 259 A1    8/2017
KR    10-1925301 B1    12/2018
(Continued)

OTHER PUBLICATIONS

Aimee Kalnoskas, "LiDAR sensor accurately measures direction, distance to objects over 60x270-degree viewing angle", Sep. 14, 2017, Analog IC Tips. (Year: 2017).*
(Continued)

*Primary Examiner* — Yuqing Xiao
*Assistant Examiner* — Clara G Chilton
(74) *Attorney, Agent, or Firm* — Sughrue Mion, PLLC

(57) ABSTRACT

A light detection and ranging (LiDAR) apparatus with a wide viewing angle includes: a first rotatable mirror array including a first plurality of inclined mirrors arranged in a circumferential direction; a plurality of light sources configured to emit light toward the first rotatable mirror array; a second rotatable mirror array including a second plurality of inclined mirrors arranged in the circumferential direction, the second rotatable mirror array facing the first rotatable mirror array to reflect the light reflected by the first rotatable mirror array to an outside of the LiDAR apparatus; and a photodetector configured to detect the light reflected by the second rotatable mirror array, wherein the plurality of light sources may be provided in a plurality of sections into which an angle range of 180 degrees or more is divided in equal intervals in the circumferential direction.

35 Claims, 17 Drawing Sheets

(51) Int. Cl.
    *G01S 7/484*     (2006.01)
    *G02B 26/08*     (2006.01)

(56) References Cited

U.S. PATENT DOCUMENTS

| | | |
|---|---|---|
| 2011/0235019 A1 | 9/2011 | Matsubara et al. |
| 2014/0151535 A1 | 6/2014 | Mori et al. |
| 2016/0341957 A1 | 11/2016 | Kano |
| 2017/0307737 A1* | 10/2017 | Ishikawa ............... G01S 7/4815 |
| 2018/0329066 A1* | 11/2018 | Pacala ................... G01S 7/4813 |
| 2019/0086539 A1 | 3/2019 | Shin et al. |
| 2019/0227175 A1* | 7/2019 | Steinberg ................ G01S 17/93 |
| 2020/0049819 A1 | 2/2020 | Cho et al. |
| 2020/0174103 A1* | 6/2020 | Gomez ................... G01S 17/42 |
| 2021/0025996 A1* | 1/2021 | Kim ........................ G01S 17/08 |
| 2021/0116562 A1* | 4/2021 | Heinonen ............. G01S 7/4865 |

FOREIGN PATENT DOCUMENTS

| | | |
|---|---|---|
| KR | 10-2020-0016675 A | 2/2020 |
| KR | 10-2020-0059426 A | 5/2020 |
| WO | 2019/133101 A2 | 7/2019 |

OTHER PUBLICATIONS

Harald Weber, "LiDAR Sensor Functionality and Variants," Sick AG Whitepaper, Jul. 2018, Total 16 pages.
Communication dated Sep. 8, 2021 issued by the European Patent Office in European Application No. 21163079.3.

\* cited by examiner

LIDAR APPARATUS HAVING WIDE-VIEWING ANGLE

CROSS-REFERENCE TO RELATED APPLICATION

This application is based on and claims priority under 35 U.S.C. § 119 to Korean Patent Application No. 10-2020-0131292, filed on Oct. 12, 2020, in the Korean Intellectual Property Office, the disclosure of which is incorporated by reference herein in its entirety.

BACKGROUND

1. Field

Example embodiments consistent with the present disclosure relate to light detection and ranging (LiDAR) apparatuses, and more particularly, to LiDAR apparatuses having a wide-viewing angle.

2. Description of Related Art

Automated guided vehicles (AGVs) used for transporting and returning goods in factories or warehouses generally travel along defined routes. However, in order to increase the work flexibility, there is an increasing need for autonomous driving based on path planning in the absence of a defined route, through simultaneous localization and mapping (SLAM). Also, technologies for avoiding obstacles using two-dimensional (2D) light detection and ranging (LiDAR) sensors have been needed. In addition, in recent years, attempts have been made to increase the work flexibility by mounting three-dimensional (3D) LiDAR sensors on various autonomous moving robots (AMRs) or forklifts in factories. Also, the demand for 3D LiDAR technology, which may be applied indoors and outdoors for transporting materials from warehouses outside the building, is increasing. The 3D LiDAR technology is advantageous not only in detecting obstacles for a wide horizontal viewing angle (about 150 degrees to about 270 degrees) and a vertical viewing angle (about 30 degrees to about 60 degrees), but also in detecting a specific viewing angle in detail in order to accurately measure a 3D state of a floor.

SUMMARY

Example embodiments address at least the above problems and/or disadvantages and other disadvantages not described above. Also, the example embodiments are not required to overcome the disadvantages described above, and may not overcome any of the problems described above.

According to an aspect of an embodiment, there is provided a light detection and ranging (LiDAR) apparatus including: a first rotatable mirror array including a first plurality of inclined mirrors arranged in a circumferential direction; a plurality of light sources configured to emit light toward the first rotatable mirror array; a second rotatable mirror array including a second plurality of inclined mirrors arranged in the circumferential direction, the second rotatable mirror array facing the first rotatable mirror array to reflect the light reflected by the first rotatable mirror array to an outside of the LiDAR apparatus; and a photodetector configured to detect the light reflected by the second rotatable mirror array, wherein the plurality of light sources may be provided in a plurality of sections into which an angle range of 180 degrees or more is divided in equal intervals in the circumferential.

The first rotatable mirror array and the second rotatable mirror array may be arranged to rotate about a same axis.

A number of the first plurality of inclined mirrors of the first rotatable mirror array may be a multiple of a number of the second plurality of inclined mirrors of the second rotatable mirror array.

The second plurality of inclined mirrors of the second rotatable mirror array may have different inclination angles.

At least a portion of the first plurality of inclined mirrors of the first rotatable mirror array may have different inclination angles.

At least two inclined mirrors of the first plurality of inclined mirrors of the first rotatable mirror array may have a same inclination angle.

The at least two inclined mirrors may having the same inclination angle to face each other, from among the first plurality of inclined mirrors of the first rotatable mirror array.

A number of scanning channels of the LiDAR apparatus in an elevation angle direction may be a product of a number of inclination angles of the first plurality of inclined mirrors of the first rotatable mirror array and a number of inclination angles of the second plurality of inclined mirrors of the second rotatable mirror array.

An angle between two adjacent light sources from among the plurality of light sources may be half of an angle between two adjacent inclined mirrors from among the second plurality of inclined mirrors of the second rotatable mirror array.

The second plurality of inclined mirrors of the second rotatable mirror array may include a first inclined mirror having a first inclination angle, a second inclined mirror having a second inclination angle, a third inclination mirror having a third inclination angle, and a fourth inclined mirror having a fourth inclination angle, and the first, second, third, and fourth inclination angles may be different from each other.

The plurality of light sources may include a first light source, a second light source, a third light source, a fourth light source, and a fifth light source that are sequentially arranged at intervals of 45 degrees within an angle range of 225 degrees in the circumferential direction.

While the second rotatable mirror array is rotating, in a first mode in which the first light source, the third light source, and the fifth light source face any one of the first to fourth inclined mirrors of the second mirror array, the first light source, the third light source, and the fifth light source may sequentially emit the light, and in a second mode in which the second light source and the fourth light source face any one of the first to fourth inclined mirrors of the second rotatable mirror array, the second light source and the fourth light source may sequentially emit the light.

The first plurality of inclined mirrors of the first rotatable mirror array include a fifth inclined mirror having a fifth inclination angle, a sixth inclined mirror having a sixth inclination angle, a seventh inclined mirror having a seventh inclination angle, an eighth inclined mirror having a eighth inclination angle, a ninth inclined mirror having the fifth inclination angle, a tenth inclined mirror having the sixth inclination angle, an eleventh inclined mirror having the seventh inclination angle, and a twelfth inclined mirror having the eighth inclination angle, and the fifth, sixth, seventh, and eighth inclination angles are different from each other.

The second rotatable mirror array may be configured to continuously rotate, and the first rotatable mirror array is configured to rotate in a stepwise manner by 45 degrees.

While the first rotatable mirror array is stopped, the second rotatable mirror array may rotate by 360 degrees, and while the first rotatable mirror array rotates by one step, the second rotatable mirror array may rotate by 90 degrees.

The LiDAR apparatus may further include: a plurality of intermediate mirrors provided in the plurality of sections to reflect the light emitted from the plurality of light sources to the first rotatable mirror array.

Multiple light sources of the plurality of light sources may be arranged in a radial direction within each section of the plurality of sections.

The light sources arranged in the radial direction within each section may be tilted at different angles.

The LiDAR apparatus may further include: a plurality of wedge prisms, each of the plurality of wedge prisms being configured to change a light traveling direction of the light, which is emitted from the multiple light sources arranged in the radial direction within each section, to be incident on a corresponding intermediate mirror at different angles.

A number of scanning channels of the LiDAR apparatus in an elevation angle direction may be a product of a number of the multiple light sources arranged in the radial direction within each section of the plurality of sections, the number of inclination angles of the first plurality of inclined mirrors of the first rotatable mirror array, and the number of inclination angles of the second plurality of inclined mirrors of the second rotatable mirror array.

Each of the plurality of intermediate mirrors may include a reflective surface of which an inclination angle is adjusted by electrical control.

The first plurality of inclined mirrors of the first rotatable mirror array may have different radial positions of reflective surfaces such that the light emitted from a same light source, among the plurality of light sources, and the light reflected by the first plurality of inclined mirrors of the first rotatable mirror array may be incident at a same position on the second rotatable mirror array.

The first plurality of inclined mirrors of the first rotatable mirror array may be a plurality of right angle prisms having an inclined surface, and the plurality of right angle prisms may have a same height and different base lengths.

A viewing angle in an azimuth direction may be about 180 degrees to about 270 degrees, and a viewing angle in an elevation angle direction may be about 30 degrees to about 60 degrees.

The LiDAR apparatus may further include: a concave mirror reflecting the light reflected by the second rotatable mirror array and converging the light on a focal point.

The photodetector may be on the focal point of the concave mirror.

The LiDAR apparatus may further include: a flat mirror that extends an optical path between the concave mirror and the photodetector by reflecting the light reflected by the concave mirror toward the photodetector; a band pass filter provided between the flat mirror and the photodetector, the band pass filter being configured to transmit only the light in an emission wavelength band of the plurality of light sources; and a lens that focuses the light on the photodetector.

The LiDAR apparatus may further include a plurality of photodetectors comprising the photodetector, the plurality of photodetectors being arranged in the circumferential direction.

A number of the plurality of photodetectors may be equal to a number of the plurality of light sources.

The LiDAR apparatus may further include: a mask provided on a light-receiving surface of the photodetector and having a plurality of openings corresponding to the plurality of photodetectors.

Each of the plurality of photodetectors may be a one-dimensional sensor array extending in a radial direction.

According to an aspect of another example embodiment, there is provided a light detection and ranging (LiDAR) apparatus including: a plurality of light source arrays, each of the plurality of light source arrays including a plurality of light sources arranged in a vertical direction; a plurality of first mirror arrays, each of plurality of first mirror arrays including a plurality of mirrors arranged to have a parabolic shape in the vertical direction, the plurality of mirrors respectively facing the plurality of light sources; a second rotatable mirror array including a plurality of inclined mirrors arranged in a circumferential direction and configured to reflect light reflected by the plurality of first mirror arrays to an outside of the LiDAR apparatus; and a photodetector configured to detect the light that is reflected by the second rotatable mirror array after being incident onto the second rotatable mirror array from the outside of the LiDAR apparatus, wherein the plurality of light source arrays and the plurality of first mirror arrays may be respectively provided within a plurality of sections into which an angle range of 180 degrees or more in the circumferential direction is divided in equal intervals.

According to an aspect of another embodiment, there is provided a light detection and ranging (LiDAR) apparatus including: a plurality of light sources configured to emit light; a photodetector configured to detect the light; a first mirror array that has a first truncated pyramid shape and reflects the light incident from the plurality of light sources; and a second mirror array that has a second truncated pyramid shape, is arranged to oppose the first mirror array in a vertical direction of the LiDAR apparatus, reflects the light that is incident from the first mirror array, to an outside of the LiDAR apparatus, and reflects the light incident from the outside of the LiDAR apparatus so that the light travels to the photodetector, wherein the first mirror array may be disposed between the second mirror array and the photodetector in the vertical direction of the LiDAR apparatus, and wherein the plurality of light sources may be arranged along a circumference of a horizontal plane of the LiDAR apparatus which is perpendicular to the vertical direction.

The plurality of light sources may be arranged in an angle range of 180 degrees or more along the circumference of the horizontal plane of the LiDAR apparatus.

The first mirror array may be configured to continuously rotate, and the second mirror array may be configured to rotate discretely.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
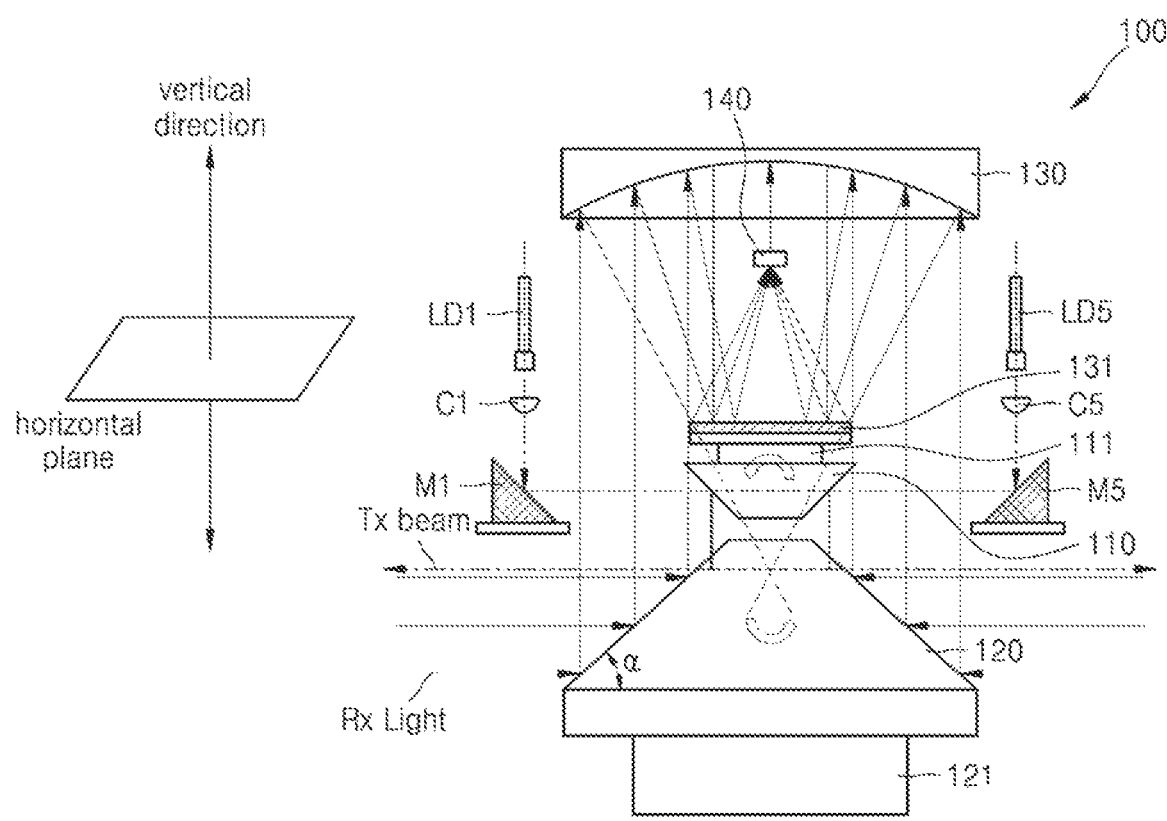
FIG. 1 is a view of a light detection and ranging (LiDAR) apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, a light detection and ranging (LiDAR) apparatus having a wide-viewing angle will be described in detail with reference to the accompanying drawings.

For example, when an element is referred to as being "on" or "above" another element, it may be directly on the other element, or intervening elements may also be present. As used herein, the singular forms "a," "an," and "the" are intended to include the plural forms as well, unless the context clearly indicates otherwise. In addition, it will be understood that when a unit is referred to as "comprising" another element, it may not exclude the other element but may further include the other element unless specifically oppositely indicates.

The use of the terms "a," "an," and "the" and similar referents is to be construed to cover both the singular and the plural. Unless explicitly stated or contradicted to the order of operations constituting the method, these operations may be performed in an appropriate order and are not necessarily limited to the order described.

In addition, terms such as " . . . unit", " . . . module", or the like refer to units that perform at least one function or operation, and the units may be implemented as hardware or software or as a combination of hardware and software.

The connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of any and all examples, or exemplary language (e.g., "such as") provided herein, is intended merely to better illuminate the inventive concept and does not pose a limitation on the scope of the inventive concept unless otherwise claimed.

FIG. 1 is a view of a light detection and ranging (LiDAR) apparatus 100 according to an example embodiment. Referring to FIG. 1, the LiDAR apparatus 100 may include a first mirror array 110 and a second mirror array 120 arranged to face each other in a vertical direction of the LiDAR apparatus 100, a plurality of light sources LD1 and LD5 emitting light toward the first mirror array 110, and a light-receiving unit that includes elements 130, 131 and 140 to detect light coming from outside by being reflected by an external object.

The first mirror array 110 may have a shape of a polygonal frustum (e.g., a square frustum, a pentagon frustum, a hexagon frustum, an octagon frustum, etc.) or a truncated pyramid (e.g., a truncated square pyramid, a truncated pentagon pyramid, a truncated hexagon pyramid, a truncated octagon pyramid, etc.). The first mirror array 110 may include a plurality of inclined mirrors arranged in a circumferential direction of a horizontal plane that is perpendicular to the vertical direction of the LiDAR apparatus 100. For example, the first mirror array 110 may be a polygon mirror when viewed from the top of the first mirror array 110, and the base of the first mirror array 110 may has a polygon shape. The first mirror array 110 may be rotatable about a rotation axis. To this end, the LiDAR apparatus 100 may further include a first motor 111 that rotates the first mirror array 110.

The second mirror array 120 is arranged to face the first mirror array 110 to reflect light reflected by the first mirror array 110 to the outside of the LiDAR apparatus 100. Like the first mirror array 110, the second mirror array 120 may also include a plurality of inclined mirrors arranged in the circumferential direction. For example, the second mirror array 120 may also be a polygon mirror. In addition, the second mirror array 120 may be rotatable about the rotation axis. To this end, the LiDAR apparatus 100 may further include a second motor 121 that rotates the second mirror array 120. The first mirror array 110 and the second mirror array 120 may be arranged to rotate about the same axis.

Although only two light sources LD1 and LD5 are shown in the cross-sectional view of FIG. 1, additional light sources may be arranged at regular intervals in the circumferential direction. Each of the light sources LD1 and LD5 may be configured to emit pulsed light at regular time intervals under the control of a processor. In addition, the light sources LD1 and LD5 may be configured to emit light in an infrared band that is not visible to the human eye. For example, the light sources LD1 and LD5 may be configured to emit light having a wavelength band in a range selected from about 800 nm to about 2,000 nm. The light sources LD1 and LD5 may be, for example, pulsed laser diodes, but are not limited thereto. When an emission wavelength is controlled within a tolerance range, a light-emitting diode LED may be used as the light sources LD1 and LD5.

The LiDAR apparatus 100 may further include a plurality of collimating lenses C1 and C5 that make the light emitted from the light sources LD1 and LD5 into parallel beams. The LiDAR apparatus 100 may further include a plurality of intermediate mirrors M1 and M5 that reflect the light emitted from the light sources LD1 and LD5 to the first mirror array 110. The intermediate mirrors M1 and M5 may be arranged in an optical path between the light sources LD1 and LD5 and the first mirror array 110. The optical path between the light sources LD1 and LD5 and the first mirror array 110 may be bent by 90 degrees by the intermediate mirrors M1 and M5. However, the intermediate mirrors M1 and M5 are be omitted, and the light sources LD1 and LD5 may be arranged to directly face the first mirror array 110 without the intermediate mirrors M1 and M5.

The light emitted from the light sources LD1 and LD5 is reflected by the first mirror array 110 and incident on the second mirror array 120. Then, the light may be scanned to the outside of the LiDAR apparatus 100 as transmission light by rotation of the second mirror array 120. A portion of the transmitted light may be reflected by an external object and returned to the LiDAR apparatus 100 as received light. The received light returned from the outside to the LiDAR apparatus 100 may be reflected back by the second mirror array 120 and transmitted to the light-receiving unit.

The light-receiving unit of the LiDAR apparatus 100 may include a concave mirror 130 that reflects received light returned from the outside reflected by the second mirror array 120 and converges the received light onto a focal point, and a photodetector 140 on the focal point of the concave mirror 130. The received light reflected by the second mirror array 120 is directly incident on the concave mirror 130 without passing through the first mirror array 110. To this end, the diameter of the second mirror array 120 may be greater than the diameter of the first mirror array 110, and the diameter of the concave mirror 130 may be similar to or greater than the diameter of the second mirror array 120. In addition, a reflective surface of the concave mirror 130 may be arranged facing the second mirror array 120, and the first mirror array 110 may be between the concave mirror 130 and the second mirror array 120. By using the concave mirror 130, received light incident on the second mirror array 120 from various external directions may be transmitted to one photodetector 140.

The LiDAR apparatus 100 may further include a flat mirror 131 that folds an optical path of the received light reflected by the concave mirror 130 by about 180 degrees. When a focal length of the concave mirror 130 is long, the flat mirror 131 may reduce the volume of the LiDAR apparatus 100 by folding the optical path of the received light by about 180 degrees. To this end, the flat mirror 131 may be arranged in a position that extends an optical path between the concave mirror 130 and the photodetector 140 by reflecting light reflected by the concave mirror 130 toward the photodetector 140. In more detail, the flat mirror 131 may be between the concave mirror 130 and the first mirror array 110, and in particular, may be on an upper surface of the first mirror array 110. The diameter of the flat mirror 131 is less than the diameter of the concave mirror 130. The received light sequentially reflected by the second mirror array 120 and the concave mirror 130 may be reflected by the flat mirror 131 and then focused on the photodetector 140.

Figure 2:
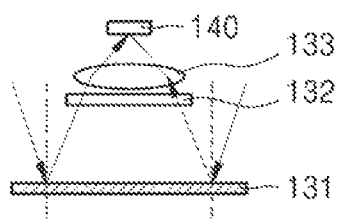
FIG. 2 is a cross-sectional view of an additional configuration of a light-receiving unit of the LiDAR apparatus illustrated in FIG. 1 according to an example embodiment.

FIG. 1 shows only the photodetector 140 between the focal point of the concave mirror 130 and the flat mirror 131 for convenience, but the LiDAR apparatus 100 may further include an additional component other than the photodetector 140. For example, FIG. 2 is a cross-sectional view illustrating an additional configuration of the light-receiving unit of the LiDAR apparatus 100 shown in FIG. 1. Referring to FIG. 2, the light-receiving unit of the LiDAR apparatus 100 may further include a band pass filter 132 and a lens 133 arranged between the flat mirror 131 and the photodetector 140. The band pass filter 132 removes noise by transmitting only light in the same wavelength band as that of light emitted from light sources LD1 and LD5. The lens 133 further focuses light on the photodetector 140. When the lens 133 is further arranged, the photodetector 140 may be on a focal point formed by the concave mirror 130 and the lens 133.

Figure 3:
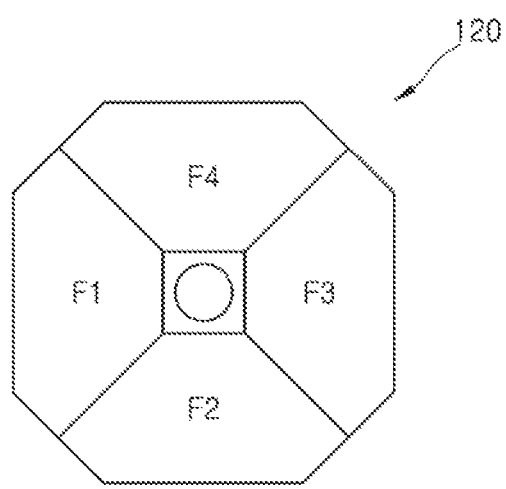
FIG. 3 is a plan view of a configuration of a second mirror array of the LiDAR apparatus illustrated in FIG. 1 according to an example embodiment.

FIG. 3 is a plan view of a configuration of the second mirror array 120 of the LiDAR apparatus 100 illustrated in FIG. 1. Referring to FIG. 3, the second mirror array 120 may have a truncated square pyramid shape in which a vertex is cut in a direction parallel to the base. Accordingly, the second mirror array 120 may have four inclined surfaces, and may include four inclined mirrors F1, F2, F3, and F4 respectively formed on the four inclined surfaces. In addition, in order to reduce the volume and weight of the second mirror array 120, four corner portions of the base that are not optically used may be further cut.

Figure 4A:
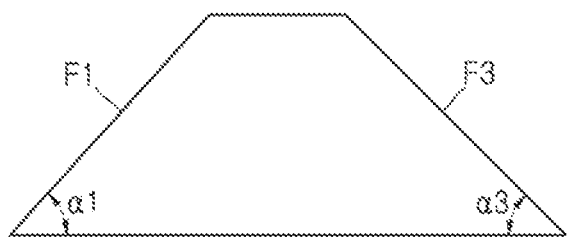
FIG. 4A is a cross-sectional view of a first inclined mirror and a third inclined mirror of a second mirror array cut in a vertical direction.
Figure 4B:
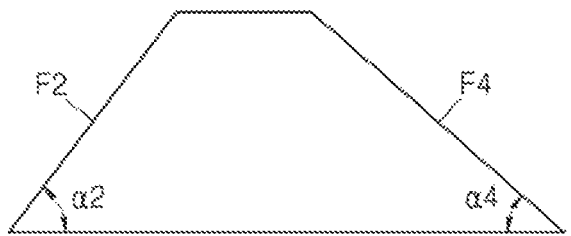
FIG. 4B is a cross-sectional view of a second inclined mirror and a fourth inclined mirror of a second mirror array in a vertical direction according to example embodiments.

FIG. 4A is a cross-sectional view of the first inclined mirror F1 and the third inclined mirror F3 of the second mirror array 120 cut in a vertical direction, and FIG. 4B is a cross-sectional view of the second inclined mirror F2 and the fourth inclined mirror F4 of the second mirror array 120 cut in a vertical direction. As illustrated in FIGS. 4A and 4B, the four inclined mirrors F1, F2, F3, and F4 of the second mirror array 120 may have different inclination angles. The first inclined mirror F1 may have a first inclination angle α1, the second inclined mirror F2 may have a second inclination angle α2 different from the first inclination angle α1, the third inclined mirror F3 may have a third inclination angle α3 different from the first and second inclination angles α1 and α2, and the fourth inclined mirror F4 may have a fourth inclination angle α4 different from the first to third inclination angles α1, α2, and α3.

FIG. 3 shows that the second mirror array 120 has a truncated quadrangular pyramid shape having four inclined mirrors in the sides of the second mirror array 120, but this is only exemplary, and the shape of the second mirror array 120 is not limited thereto. For example, the second mirror array 120 may have a truncated pentagonal pyramid shape having five inclined mirrors, or may have a truncated hexagonal pyramid shape having six inclined mirrors. FIG. 3 illustrates that a bottom base and a top base of the second mirror array 120 have an octagon shape and a square shape, respectively, but different shapes may be used for the bottom base and the top base of the second mirror array 120.

Figure 5A:
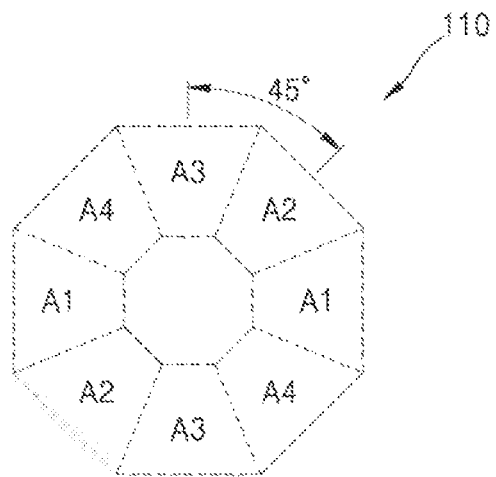
FIG. 5A is a plan view of a configuration of a first mirror array according to an example embodiment.

FIG. 5A is a plan view of a configuration of the first mirror array 110 according to an example embodiment. Referring to FIG. 5A, the first mirror array 110 may have a truncated polygonal pyramid shape in which a vertex is cut in a direction parallel to the base. In particular, the number of sides of the first mirror array 110 may be a multiple of the number of sides of the second mirror array 120. For example, when the second mirror array 120 is a truncated square pyramid, the first mirror array 110 may have a truncated octagonal pyramid shape or a truncated dodecagonal pyramid shape. FIG. 5A illustrates an example in which the first mirror array 110 has a truncated octagonal pyramid shape. In this case, the first mirror array 110 may have 8 inclined surfaces, and may include 8 inclined mirrors A1, A2, A3, and A4 respectively formed on the 8 inclined surfaces. Accordingly, the number of the inclined mirrors A1, A2, A3, and A4 of the first mirror array 110 is a multiple of the number of the inclined mirrors F1, F2, F3, and F4 of the second mirror array 120.

In addition, the inclined mirrors A1, A2, A3, and A4 of the first mirror array 110 may have different inclination angles. For example, the first mirror array 110 may include two first inclined mirrors A1 having a fifth inclination angle, two second inclined mirrors A2 having a sixth inclination angle different from the fifth inclination angle, two third inclined mirrors A3 having a seventh inclination angle different from the fifth and sixth inclination angles, and two fourth inclined mirrors A4 having a eighth inclination angle different from the fifth to seventh inclination angles. Accordingly, the first mirror array 110 may include at least two inclined mirrors having the same inclination angle. When the first mirror array 110 has a truncated octagonal pyramid shape, among the plurality of inclined mirrors A1, A2, A3, and A4 of the first mirror array 110, two inclined mirrors having the same inclination angle may be arranged to face each other.

Figure 5B:
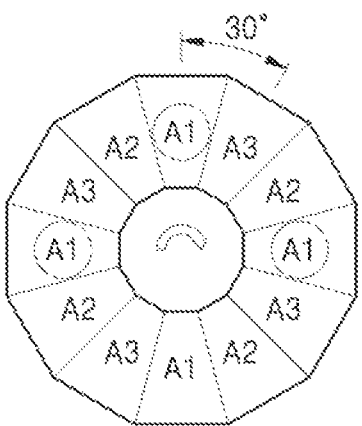
FIG. 5B is a plan view of a configuration of a first mirror array according to another example embodiment.

FIG. 5B is a plan view of a configuration of the first mirror array 110 according to another example embodiment. Referring to FIG. 5B, the first mirror array 110 may have a truncated dodecagonal pyramid shape. In this case, the first mirror array 110 may have 12 inclined surfaces, and may include 12 inclined mirrors A1, A2, and A3 respectively formed on the 12 inclined surfaces. The inclined mirrors A1, A2, and A3 of the first mirror array 110 may have different inclination angles. For example, the first mirror array 110 may include four first inclined mirrors A1 having a fifth inclination angle, four second inclined mirrors A2 having a sixth inclination angle different from the fifth inclination angle, and four third inclined mirrors A3 having a seventh inclination angle different from the fifth and sixth inclination angles.

FIG. 5A and FIG. 5B are only some examples of various first mirror arrays 110, and the first mirror array 110 may be configured differently from FIGS. 5A and 5B. For example, when the first mirror array 110 has a truncated dodecagonal pyramid shape, the first mirror array 110 may include four types of inclined mirrors having different inclination angles, and three inclined mirrors having the same inclination angle may be arranged in each of them. Alternatively, when the first mirror array 110 has a truncated dodecagonal pyramid shape, the first mirror array 110 may include six types of inclined mirrors having different inclination angles, and two inclined mirrors having the same inclination angle may be arranged in each of them. In addition, when the second mirror array 120 has a pentagonal shape, the first mirror array 110 may have a truncated decagonal pyramid shape.

Each of the circles indicated in FIG. 5B exemplarily shows a beam diameter of transmission light incident on the first mirror array 110. When configuring the first mirror array 110, the beam diameter of the transmission light may be considered. For example, the first mirror array 110 may be configured such that the width of each of the inclined mirrors of the first mirror array 110 is not less than the beam diameter of the transmission light at a position on the inclined mirror where the transmission light is incident.

Figure 6:
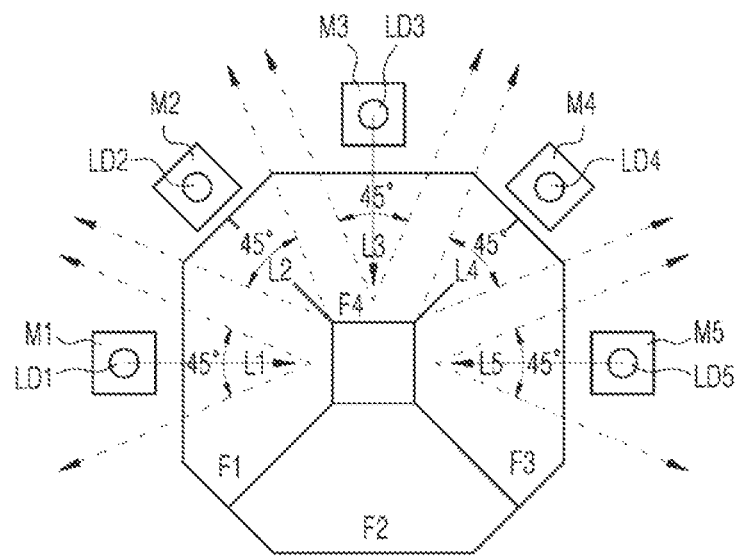
FIG. 6 is a view illustrating an arrangement relationship between a second mirror array and a plurality of light sources according to an example embodiment.

FIG. 6 is a view illustrating an arrangement relationship between the second mirror array 120 and a plurality of light sources. Referring to FIG. 6, a plurality of light sources LD1, LD2, LD3, LD4, and LD5 may be arranged in a plurality of sections in which an angle range of 180 degrees or more in a circumferential direction is divided in equal intervals, respectively. For example, when the second mirror array 120 has a truncated square pyramid shape, the five light sources LD1, LD2, LD3, LD4, and LD5 may be sequentially arranged in the circumferential direction at intervals of 45 degrees within an angle range of 225 degrees. In addition, five intermediate mirrors M1, M2, M3, M4, and M5 may be sequentially arranged at intervals of 45 degrees in the circumferential direction to reflect light emitted from the five light sources LD1, LD2, LD3, LD4, and LD5 to the first mirror array 110. When the second mirror array 120 has a truncated hexagonal pyramid shape, nine light sources may be sequentially arranged in the circumferential direction at intervals of 30 degrees within an angle range of 270 degrees.

Accordingly, an angle between two adjacent light sources from among the plurality of light sources may be half of an angle between two adjacent inclined mirrors among the plurality of inclined mirrors of the second mirror array 120. For example, when the second mirror array 120 has a truncated square pyramid shape, the angle between two adjacent inclined mirrors is 90 degrees and the plurality of light sources are arranged at intervals of 45 degrees. When the second mirror array 120 has a truncated hexagonal pyramid shape, the angle between two adjacent inclined mirrors is 60 degrees and the plurality of light sources are arranged at intervals of 30 degrees.

By arranging a plurality of light sources in this manner, it is possible to secure a horizontal viewing angle in a wide angle range of 180 degrees or more in an azimuth direction. While the second mirror array 120 is rotating, light emitted from each light source is not scanned over the entire viewing angle range in the azimuth direction, but is scanned only within an angle section in which each light source is arranged. For example, when five light sources are arranged at an angle of 45 degrees, light emitted from each light source is scanned within a range of −22.5 to +22.5 degrees around the light source. Further, when nine light sources are arranged at an angle of 30 degrees, light emitted from each light source is scanned within a range of −15 to +15 degrees around the light source.

However, because the number of light sources is greater than the number of inclined mirrors of the second mirror array 120 within a horizontal viewing angle range, light emitted from all light sources is not simultaneously scanned by the inclined mirrors of the second mirror array 120. Therefore, a scanning operation in the azimuth direction may be performed by being divided into two modes. For example, FIGS. 7A and 7B exemplarily show changes in a scanning mode according to rotation of the second mirror array 120.

Figure 7A:
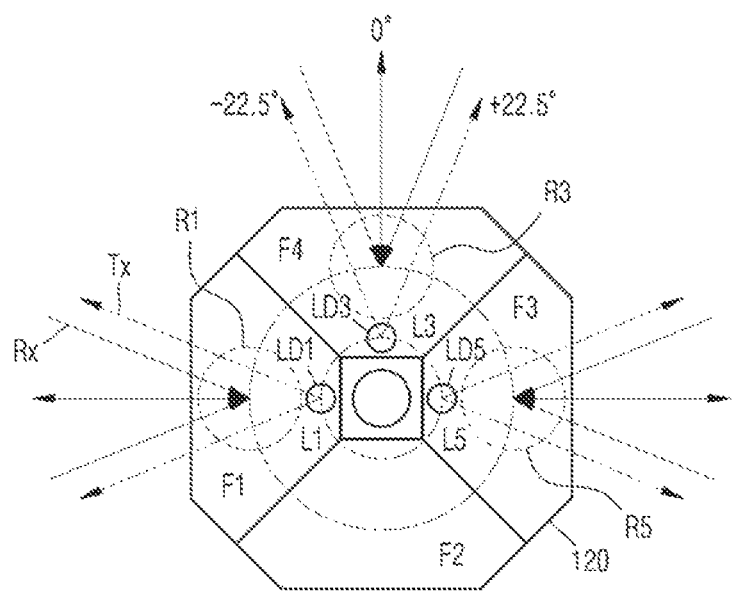
FIGS. 7A and 7B are views illustrating changes in a scanning mode according to the rotation of a second mirror array according to example embodiments.

Referring to FIG. 7A, in a first mode, the first light source LD1, the third light source LD3, and the fifth light source LD5 face the first inclined mirror F1, the fourth inclined mirror F4, and the third inclined mirror F3 of the second mirror array 120 respectively, and the second light source LD2 and the fourth light source LD4 face the boundary between two adjacent inclined mirrors. In this case, the second light source LD2 and the fourth light source LD4 are in an off state, and the first light source LD1, the third light source LD3, and the fifth light source LD5 alternately and sequentially emit light. Then, the light emitted from the first light source LD1, the third light source LD3, and the fifth light source LD5 is scanned in an azimuth direction.

In an example shown in FIG. 7A, light L1 emitted from the first light source LD1 may be scanned by the first inclined mirror F1. In addition, light L3 emitted from the third light source LD3 may be scanned by the fourth inclined mirror F4, and light L5 emitted from the fifth light source LD5 may be scanned by the third inclined mirror F3. However, this is only an example, an inclined mirror for scanning the lights L1, L3, and L5 emitted from the first light source LD1, the third light source LD3, and the fifth light source LD5 may change as the second mirror array 120 rotates.

The first light source LD1, the third light source LD3, and the fifth light source LD5 alternately and repeatedly start to emit light when an angle between a mirror surface of an inclined mirror facing each of the light sources and each of the light sources reaches within −22.5 degrees. For example, while the second mirror array 120 is rotating, after the first light source LD1 instantaneously emits pulsed light, the third light source LD3 instantaneously emits pulsed light, and then the fifth light source LD5 instantaneously emits pulsed light. Then, the first light source LD1 instantaneously emits pulsed light again. In the meantime, when the second mirror array 120 rotates and an angle between a mirror surface of an inclined mirror facing each of the light sources and each of the light sources exceeds +22.5 degrees, the first mode is terminated. The first light source LD1, the third light source LD3, and the fifth light source LD5 are turned off. Accordingly, the light emitted from each of the first light source LD1, the third light source LD3, and the fifth light source LD5 is scanned in an azimuth direction within a section of an angle range of 45 degrees in which each light source is arranged.

Figure 7B:
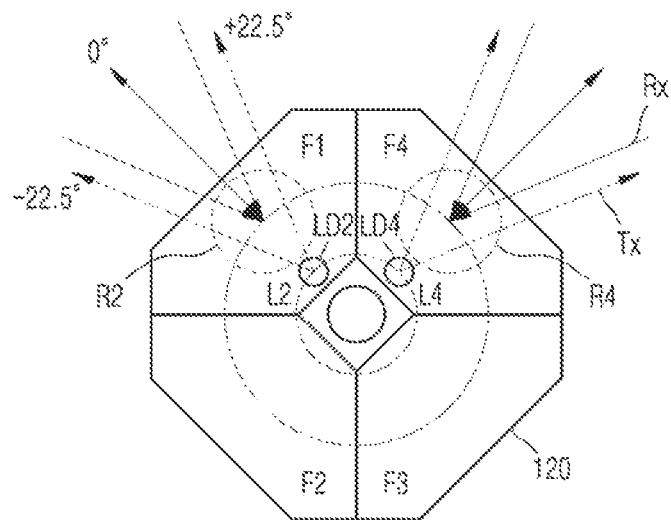

Referring to FIG. 7B, in a second mode, the second light source LD2 and the fourth light source LD4 face the first inclined mirror F1 and the fourth inclined mirror F4 of the second mirror array 120, and the first light source LD1, the third light source LD3, and the fifth light source LD5 face the boundary between two adjacent inclined mirrors. In this case, the first light source LD1, the third light source LD3, and the fifth light source LD5 are in an off state, and the second light source LD2 and the fourth light source LD4 alternately and sequentially emit light. The light emitted from each of the second light source LD2 and the fourth light source LD4 is scanned in an azimuth direction within a section of an angle range of 45 degrees in which each light source is arranged. In this way, the LiDAR apparatus 100 may overall have a horizontal viewing angle of 225 degrees.

FIGS. 7A and 7B illustrate a case in which the second mirror array 120 has a truncated quadrangular pyramid shape, but even when the second mirror array 120 has a different shape, scanning in the azimuth direction may be performed using the same principle. For example, when the second mirror array 120 has a truncated hexagonal pyramid shape and nine light sources are arranged, five odd-numbered light sources alternately and sequentially emit light in the first mode, and in the second mode, four even-numbered light sources may alternately and sequentially emit light.

On the other hand, in FIGS. 7A and 7B, dashed circles represent received lights R1, R2, R3, R4, and R5 reflected back from an external object. Light transmission and reception are performed coaxially through the same inclined mirror of the second mirror array 120. For example, when the light L1 emitted from the first light source LD1 is scanned by the first inclined mirror F1, the received light R1 reflected back from an external object may be incident on the first inclined mirror F1. The position at which the lights L1, L2, L3, L4, and L5 transmitted to the outside are incident on the inclined mirror and the position at which the received lights R1, R2, R3, R4, and R5 are incident on the same inclined mirror may be different. For example, the lights L1, L2, L3, L4, and L5 transmitted to the outside may be incident on an upper portion of the inclined mirror instead of the center. This may be adjusted by the size of the first mirror array 110. In this case, the received light R1, R2, R3, R4, and R5 may be incident on a lower portion of the inclined mirror.

Figure 8:
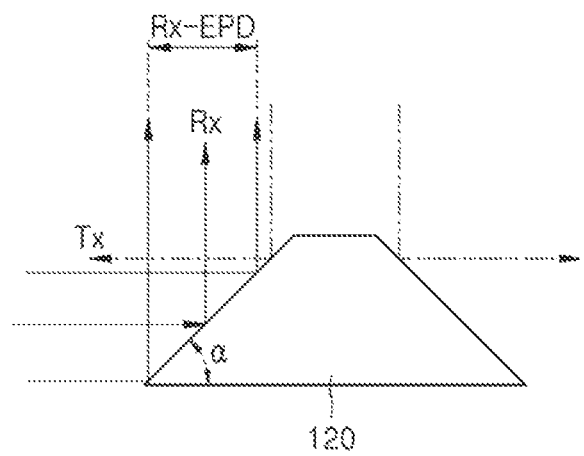
FIG. 8 is a view of transmission light and received light incident on one inclined mirror of a second mirror array according to an example embodiment.

FIG. 8 is a view of a transmission light and a received light incident on one inclined mirror of the second mirror array 120. As described above, transmission light Tx is incident on an upper portion of the inclined mirror of the second mirror array 120, and received light Rx is incident on a lower portion of the same inclined mirror. A beam diameter of the received light Rx may be greater than a beam diameter of the transmission light Tx. For example, the beam diameter of the transmission light Tx may be about 5.5 mm, and the received light Rx may have an entrance pupil diameter (EPD) of about 20 mm or more. An incident position of the received light Rx having a large diameter may be offset with respect to an incident position of the transmission light Tx by making the transmission light Tx incident on an almost upper edge of the inclined mirror. By offsetting the transmission light Tx and the received light Rx with respect to each other, optical interference between the transmission light Tx and the received light Rx may be minimized.

Figure 9:
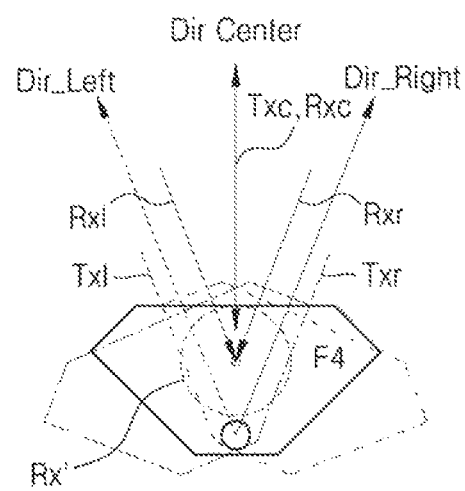
FIG. 9 is a view illustrating a relative positional relationship between the received light and the inclined mirror according to an example embodiment, the received light being caused by the transmission light scanned in different directions within one angle section while a second mirror array is rotating.

FIG. 9 exemplarily shows a relative positional relationship between pieces of received light caused by pieces of transmission light scanned in different directions within one angle section while the second mirror array 120 is rotating and an inclined mirror. According to the rotation of the second mirror array 120, the transmission light may be projected in a left, center, or right direction. When transmission light Txc is projected toward the center of the inclined mirror, received light Rxc is incident on the center of the inclined mirror. When transmission light Txl is projected in the left direction of the inclined mirror when viewed from above the second mirror array 120, received light Rxl may be incident on the right edge of the inclined mirror. In addition, when transmission light Txr is projected in the right direction of the inclined mirror when viewed from above the second mirror array 120, received light Rxr may be incident on the left edge of the inclined mirror. Because a lower portion of the inclined mirror has a larger area than an upper portion of the inclined mirror, the received lights Rxl, Rxc, and Rxr having an increased EPD may be sufficiently incident on an area Rx' of the inclined mirror.

By rotating the second mirror array 120, scanning may be performed in the azimuth direction in the above-described manner. Scanning in an elevation angle direction may be performed by a combination of the first mirror array 110 and the second mirror array 120. Because the inclined mirrors of the first mirror array 110 have a plurality of different inclination angles and the inclined mirrors of the second mirror array 120 have a plurality of different inclination angles, light may travel in different elevation angle directions according to a combination of the inclined mirror of the first mirror array 110 and the inclined mirror of the second mirror array 120 to which light is incident. The number of scanning channels in the elevation angle direction is given by a product of the number of inclination angles of the plurality of inclined mirrors of the first mirror array 110 and the number of inclination angles of the plurality of inclined mirrors of the second mirror array 120. For example, when the first mirror array 110 has four different inclination angles and the second mirror array 120 has four different inclination angles, 16 scanning channels may be formed in the elevation angle direction. The vertical viewing angle is given by (the number of scanning channels in the elevation direction-1)× (vertical angular resolution).

The first mirror array 110 and the second mirror array 120 may continuously rotate at different rotation speeds such that the plurality of inclination angles of the first mirror array 110 and the plurality of inclination angles of the second mirror array 120 may be evenly combined. Alternatively, the first mirror array 110 may be stepwise driven and the second mirror array 120 may be continuously rotated. For example, after the second mirror array 120 rotates by 360 degrees while the first mirror array 110 is stopped, the first mirror array 110 may rotate by an angle between two adjacent inclined mirrors of the first mirror array 110. In this case, the first motor 111 that rotates the first mirror array 110 may be a step motor.

Figure 10:
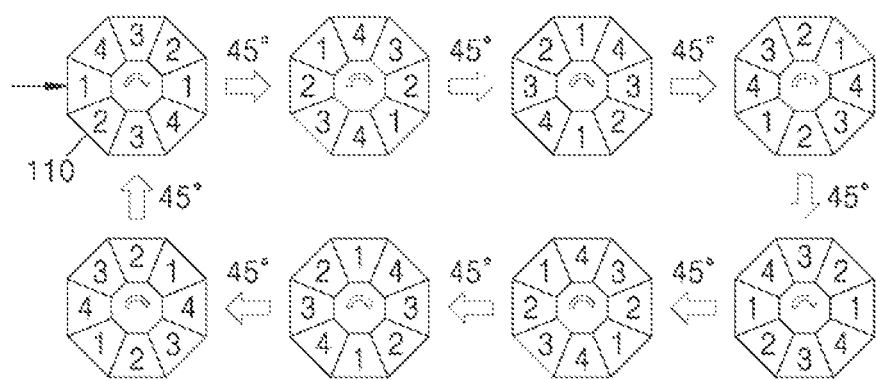
FIG. 10 is a view illustrating a sequential step drive of a first mirror array according to an example embodiment.

FIG. 10 exemplarily shows a sequential step drive of the first mirror array 110. FIG. 10 exemplarily shows that the first mirror array 110 has a truncated octagonal pyramid shape having eight inclined mirrors. In this case, the first mirror array 110 may rotate stepwise or discretely by 45 degrees in a clockwise direction. For example, the first mirror array 110 may rotate by 360 degrees during eight steps. Because two inclined mirrors having the same inclination angle are symmetrically arranged in the first mirror array 110, when the first mirror array 110 rotates half a turn during four steps, scanning in the elevation angle direction of one frame may be completed. Although FIG. 10 illustrates that the first mirror array 110 rotates clockwise, it is also possible to rotate counterclockwise.

Figure 11:
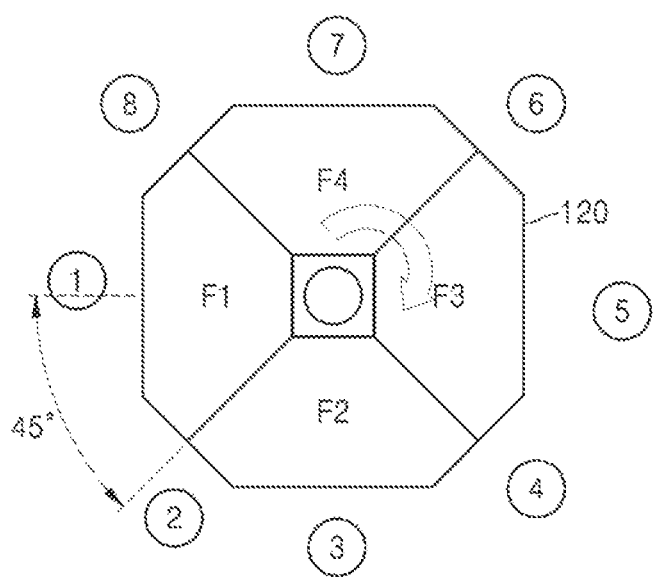
FIG. 11 is a view of a plurality of regions of a second mirror array that rotates continuously according to an example embodiment.

FIG. 11 exemplarily shows a plurality of regions of the second mirror array 120 continuously rotating. Referring to FIG. 11, when the second mirror array 120 rotates clockwise, areas from ① to ⑧ face the inclined mirrors of the first mirror array 110 in sequence. Alternatively, when the second mirror array 120 rotates counterclockwise, areas from ① to ② face the inclined mirrors of the first mirror array 110 in sequence.

However, because the second mirror array 120 continues to rotate while the first mirror array 110 is stepped to a next position after one rotation of the second mirror array 120, the position of the inclined mirror of the first mirror array 110 and the position of the inclined mirror of the second mirror array 120 may not be exactly the same. Therefore, an appropriate time delay may be applied to the step drive and stopping operations of the first mirror array 110 such that the second mirror array 120 rotates by 90 degrees relative to the first mirror array 110 while the first mirror array 110 performs one step drive. For example, the second mirror array 120 rotates by 360 degrees while the first mirror array 110 is stopped, the second mirror array 120 may rotate by 90 degrees while the first mirror array 110 is stepped to a next position, and the second mirror array 120 may rotate by 360 degrees while the first mirror array 110 is stopped again. Then, while elevation angle direction scanning of one frame is performed, the first mirror array 110 may rotate half a turn and the second mirror array 120 may rotate 5 rotations.

Figure 12:
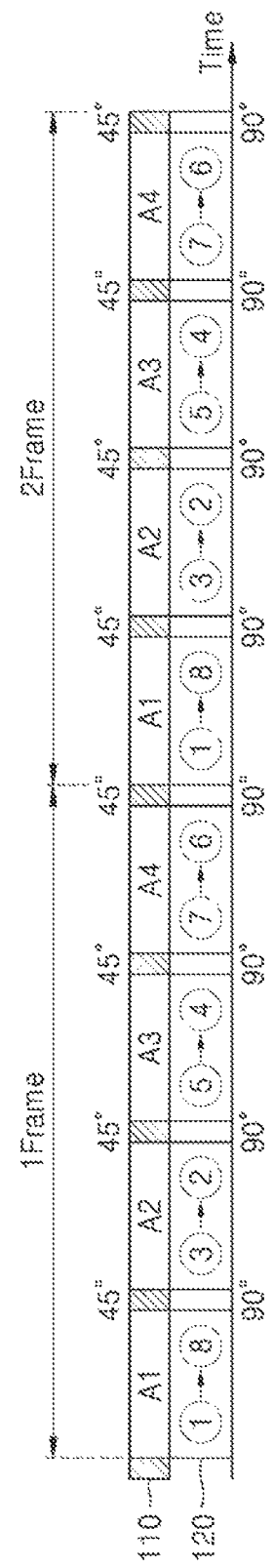
FIG. 12 is a view illustrating a change in a relative position according to the rotation of a first mirror array and a second mirror array according to an example embodiment.

FIG. 12 exemplarily shows a change in relative position according to the rotation of the first mirror array 110 and the second mirror array 120. First, areas from ① to ⑧ of the second mirror array 120 face the first inclined mirror A1 of the first mirror array 110 in sequence while the second mirror array 120 rotates by 360 degrees. Thereafter, while the first mirror array 110 is stepped to a next position, the second mirror array 120 rotates from area ① to area ②. In addition, areas ③ to ② of the second mirror array 120 face the second inclined mirror A2 of the first mirror array 110 in sequence while the second mirror array 120 rotates by 360 degrees. While the first mirror array 110 is stepped to a next position, the second mirror array 120 rotates from areas ③ to ④. Then, areas ⑤ to ④ of the second mirror array 120 face the third inclined mirror A3 of the first mirror array 110 in sequence while the second mirror array 120 rotates by 360 degrees. While the first mirror array 110 is stepped to a next position, the second mirror array 120 rotates from areas ⑤ to ⑥. Then, areas ⑦ to ⑥ of the second mirror array 120 face the fourth inclined mirror A4 of the first mirror array 110 in sequence while the second mirror array 120 rotates by 360 degrees. Finally, while the first mirror array 110 is stepped to a next position, the second mirror array 120 is rotated from areas ⑦ to ⑧ to complete one frame.

Figure 13:
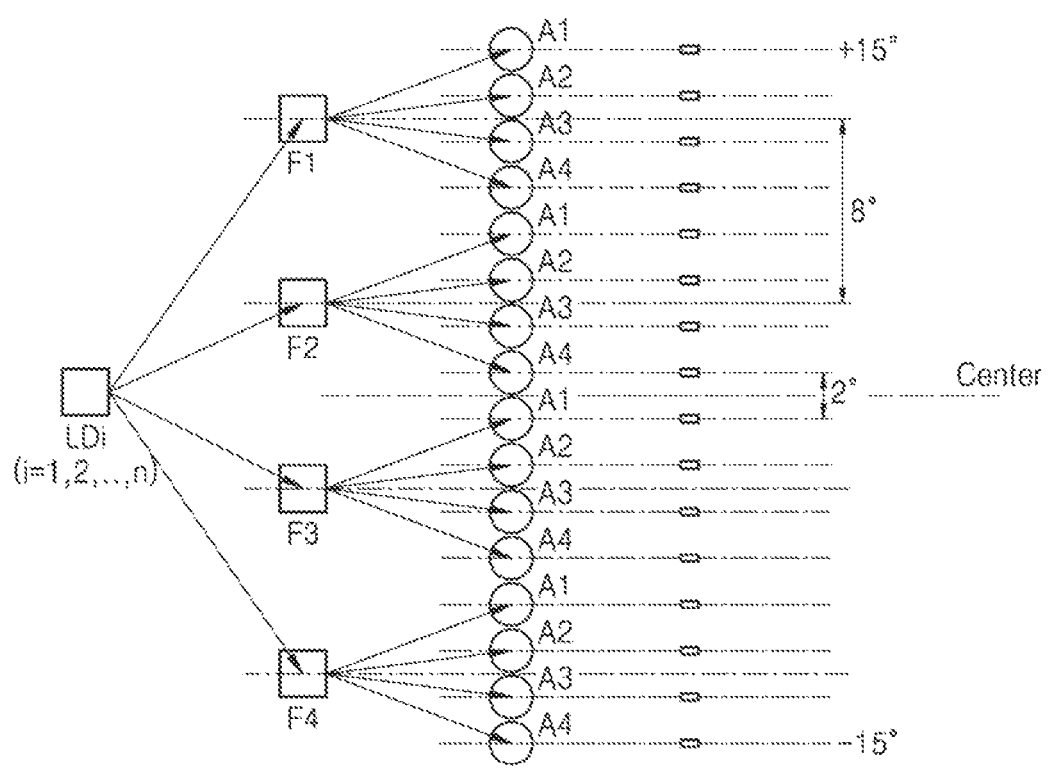
FIG. 13 is a view of a plurality of vertical channels in an elevation angle direction formed according to a change in a relative position between a first mirror array and a second mirror array according to an example embodiment.

FIG. 13 exemplarily shows a plurality of vertical channels in an elevation angle direction formed according to a change in a relative position between the first mirror array 110 and the second mirror array 120. In the case illustrated in FIGS. 10 to 12, 16 scanning channels may be formed in the elevation angle direction. Assuming that inclined mirrors of the first mirror array 110 optically have inclination angles of −3 degrees, −1 degrees, +1 degrees, and +3 degrees, and the inclined mirrors of the second mirror array 120 optically have inclination angles of −12 degrees, −4 degrees, +4 degrees, and +12 degrees, scanning in each elevation direction is possible at intervals of 2 degrees from −15 degrees to +15 degrees. Thus, a vertical viewing angle may be 30 degrees. Here, the inclination angles represent angles increased or decreased based on 45 degrees.

The configurations of the first mirror array 110 and the second mirror array 120 described with reference to FIGS. 10 to 13 are illustrated for convenience of description. When the configurations of the first mirror array 110 and the second mirror array 120 are selected differently, the number of scanning channels in the elevation angle direction, the range of the vertical viewing angle, the number of rotations of the second mirror array 120 during one frame, etc. Further, in FIG. 13, it is exemplified that inclination angles of the inclined mirrors of the second mirror array 120 are greater than inclination angles of the inclined mirrors of the first mirror array 110, but are not limited thereto.

Figure 14:
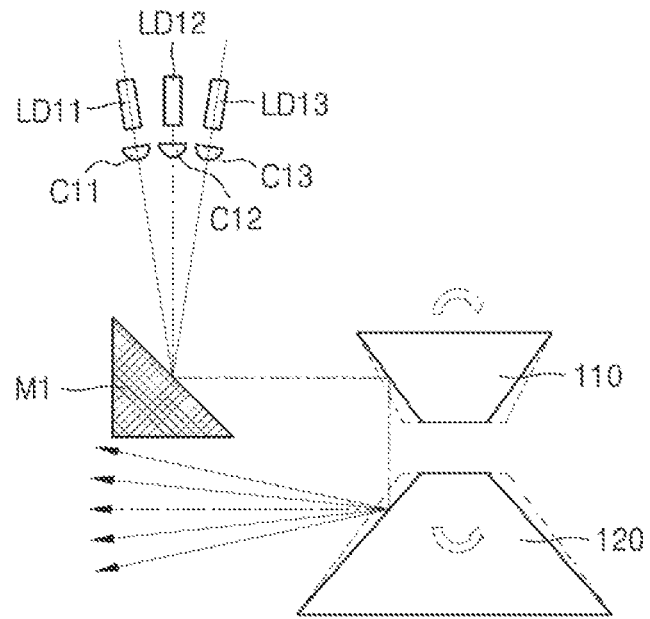
FIG. 14 is a view showing a plurality of light sources emitting light at different inclination angles according to an example embodiment.

FIG. 14 exemplarily shows an example embodiment including a plurality of light sources emitting light at different inclination angles. In order to further increase the number of scanning channels in an elevation angle direction, an incident angle of light incident on the first mirror array 110 from a light source may be multiplexed. In other words, light may be incident on the first mirror array 110 at a number of different inclination angles. To this end, as shown in FIG. 14, a plurality of light sources LD11, LD12, and LD13 may be arranged in a radial direction within one angle section in an azimuth direction. The plurality of light sources LD11, LD12, and LD13 arranged in the radial direction within one angle section may be tilted at different angles. Light emitted from the plurality of light sources LD11, LD12, and LD13 passes through corresponding collimating lenses C11, C12, and C13, and is incident on one intermediate mirror M1 at different angles. Then, light reflected by the intermediate mirror M1 is incident on the first mirror array 110 at different angles. As a result, light emitted from the plurality of light sources LD11, LD12, and LD13 may be scanned at different angles in the elevation direction by the second mirror array 120.

Figure 15:
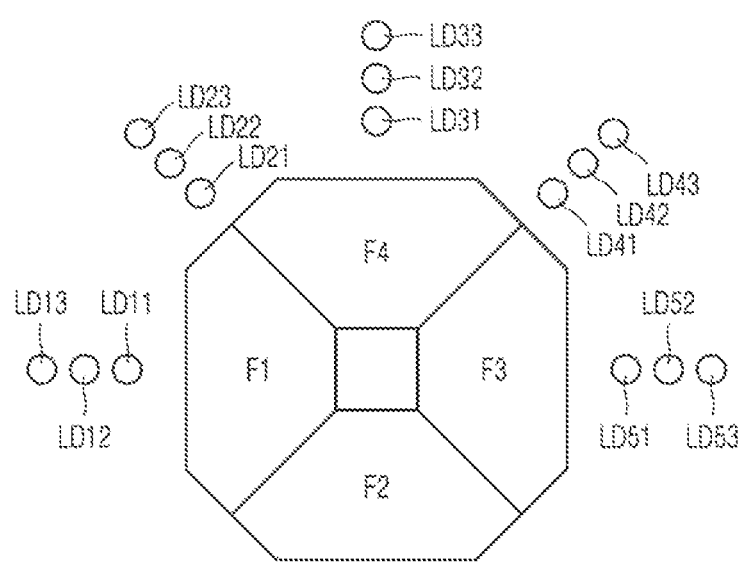
FIG. 15 is a view of an arrangement relationship between a second mirror array and a plurality of light sources in the example embodiment shown in FIG. 14.

FIG. 15 exemplarily shows an arrangement relationship between the second mirror array 120 and the plurality of light sources in the example embodiment shown in FIG. 14. Referring to FIG. 15, when the second mirror array 120 has a truncated square pyramid shape, a plurality of light sources may be arranged in the radial direction within five angle ranges arranged in the circumferential direction at intervals of 45 degrees, respectively. For example, the plurality of light sources LD11, LD12, LD13 are arranged in the radial direction in a first angle section, and the plurality of light sources LD11, LD12, and LD13 are tilted at different angles. Further, a plurality of light sources LD21, LD22, and LD23 are arranged in the radial direction in a second angle section, and the plurality of light sources LD21, LD22, LD23 are tilted at different angles. Similarly, within the third to fifth angle sections, a plurality of light sources LD31, LD32, and LD33, a plurality of light sources LD41, LD42, and LD43, and a plurality of light sources LD51, LD52, and LD53 that are tilted at different angles may be arranged in the radial direction. FIGS. 14 and 15 illustrate that three light sources are arranged within one angle section, this is only an example, and the disclosure is not limited thereto.

Figure 16:
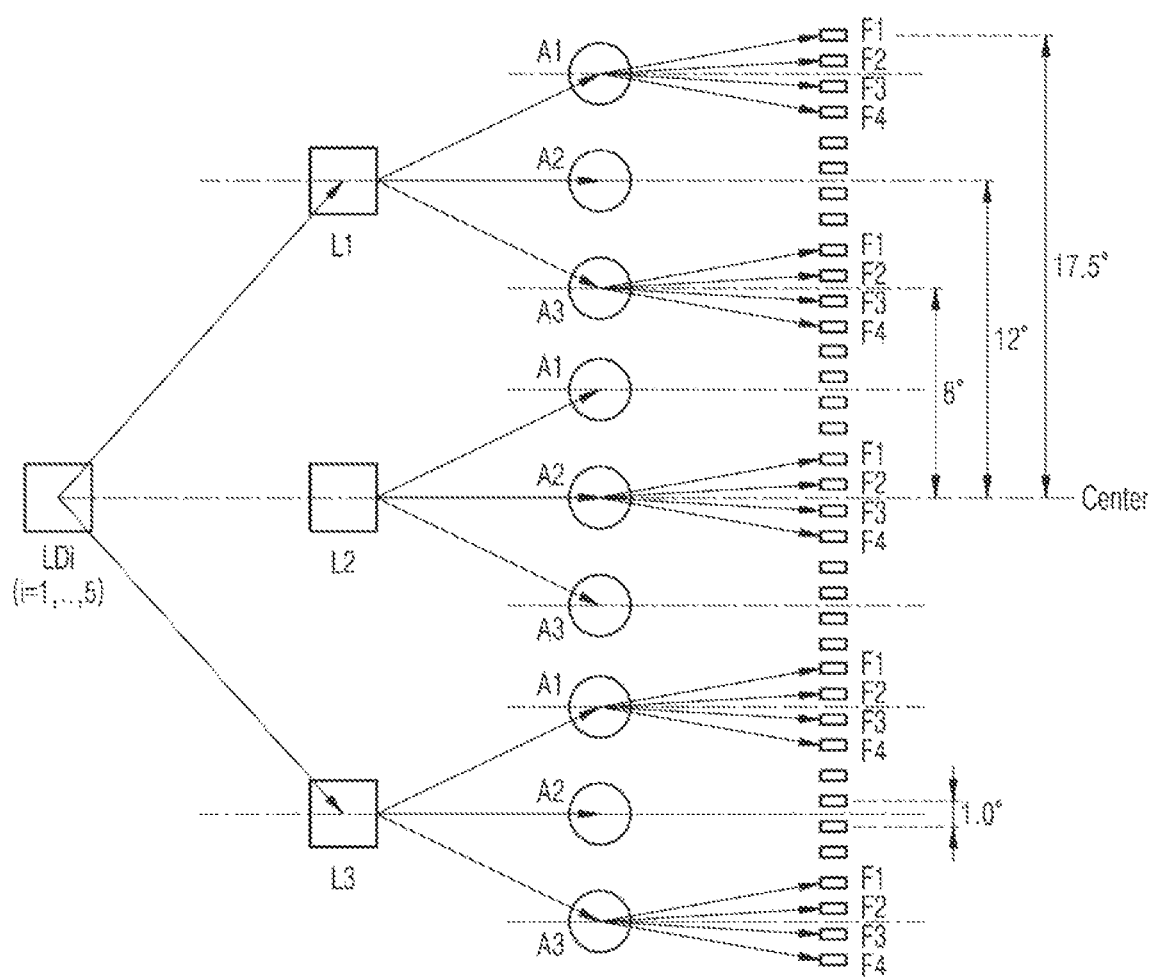
FIG. 16 is a view of a plurality of vertical channels in an elevation angle direction formed according to a change in a relative position between a first mirror array and a second mirror array in the example embodiment shown in FIG. 14.

When a plurality of light sources are tilted at different angles within one angle section, the number of scanning channels in the elevation angle direction is given by a product of the number of light sources tilted at different angles, the number of inclination angles of a plurality of inclined mirrors of the first mirror array 110, and the number of inclination angles of a plurality of inclined mirrors of the second mirror array 120. For example, FIG. 16 exemplarily shows a plurality of vertical channels in an elevation angle direction formed according to a change in a relative position between the first mirror array 110 and the second mirror array 120 in the example embodiment shown in FIG. 14. In FIG. 16, it is assumed that the number of light sources tilted at different angles is three, the first mirror array 110 has 3 inclination angles, and the second mirror array 120 has 4 inclination angles. In addition, it is assumed that tilting angles of the three light sources are optically −12 degrees, 0 degrees, and +12 degrees, inclined mirrors of the first mirror array 110 optically have inclination angles of −4 degrees, 0 degrees, and +4 degrees, and inclined mirrors of the second mirror array 120 optically have inclination angles of −1.5 degrees, −0.5 degrees, +0.5 degrees, and +1.5 degrees. Here, the tilting angles represent angles increased or decreased relative to a vertical direction. In this case, the number of scanning channels in an elevation angular direction is 36, and scanning in the elevation angular direction is possible at intervals of 1 degree from −17.5 degrees to +17.5 degrees. Therefore, a vertical viewing angle is 35 degrees.

Figure 17:
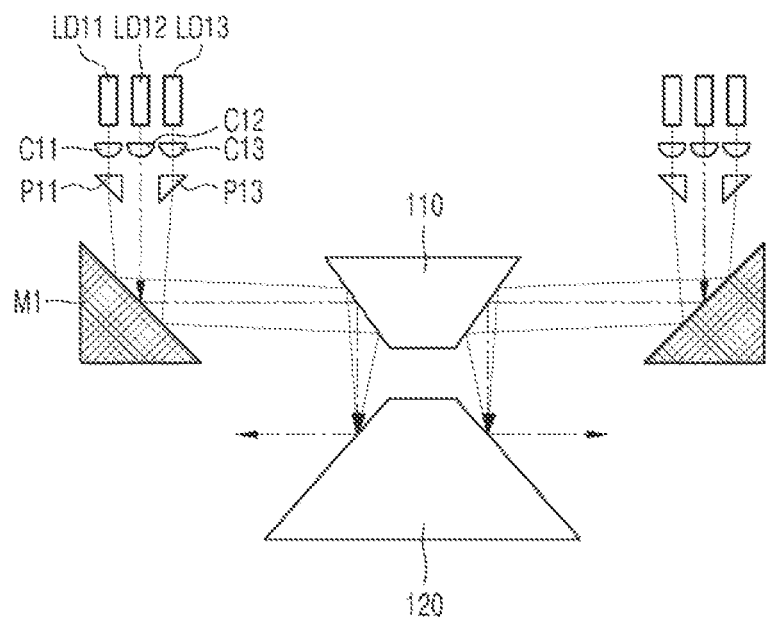
FIGS. 17 to 19 are views illustrating multiplexing an inclination angle of light emitted from a light source without obliquely arranging a light source according to various example embodiments.
Figure 18:
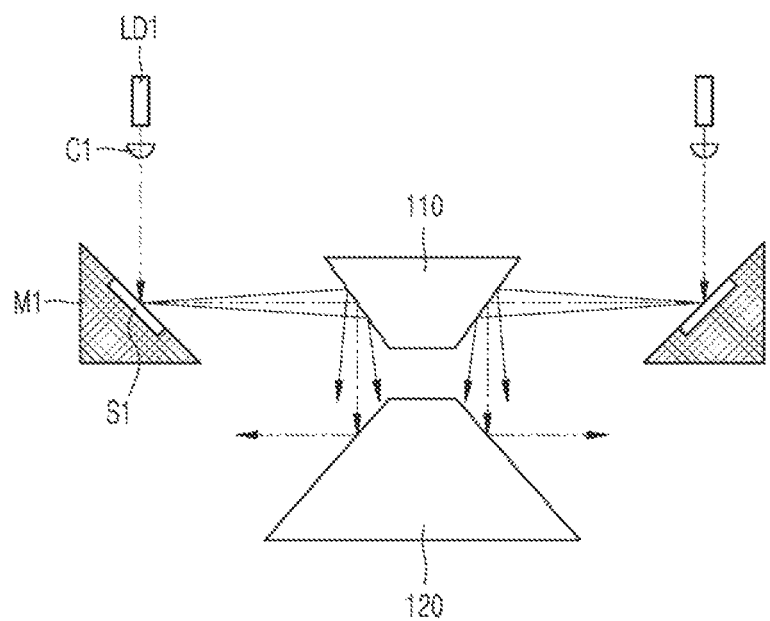
Figure 19:
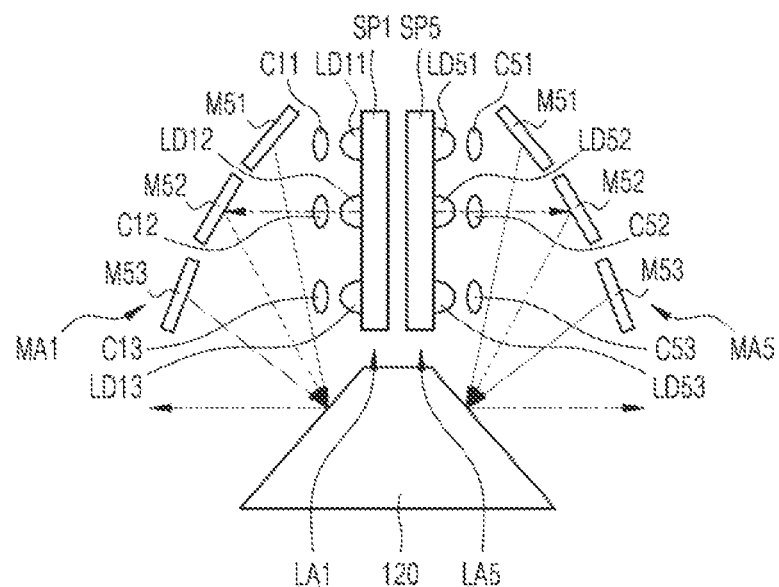

In FIG. 14, the plurality of light sources LD11, LD12, and LD13 are shown to be inclined, but in this case, assembly and maintenance may be difficult. FIGS. 17 to 19 are views illustrating various example embodiments for multiplexing an inclination angle of light emitted from a light source without obliquely arranging a light source.

Referring to FIG. 17, the plurality of light sources LD11, LD12, and LD13 in one angle section are arranged parallel to each other. In order to multiplex inclination angles of light emitted from the plurality of light sources LD11, LD12, and LD13 arranged in parallel, among the plurality of light sources LD11, LD12, and LD13, wedge prisms P11 and P13 may be arranged in an optical path between some of the light sources LD11 and LD13 and the intermediate mirror M1. The two wedge prisms P11 and P13 may change a light traveling direction to different angles. The wedge prisms P11 and P13 may in particular be arranged in an optical path between the collimating lenses C11 and C13 and the intermediate mirror M1. Further, among the plurality of light sources LD11, LD12, and LD13, no wedge prism may be arranged in an optical path between some of the light sources LD12 and the intermediate mirror M1. The above-described configuration may be applied to the light sources LD21, LD22, LD23; LD31, LD32, LD33; LD41, LD42, LD43; LD51, LD52, and LD53 arranged in all other angle sections shown in FIG. 15.

Referring to FIG. 18, the intermediate mirror M1 may include a reflective surface S1 where the inclination angle is adjusted by electrical control. For example, the reflective surface S1 of the intermediate mirror M1 may be composed of micro electro mechanical systems (MEMS). In this case, only one light source LD1 may be arranged within one angle section. Light emitted from the light source LD1 may be incident on the first mirror array 110 at various angles according to a change in the inclination angle of the reflective surface S1 of the intermediate mirror M1.

Referring to FIG. 19, a LiDAR apparatus may not include the rotating first mirror array 110. Instead, the LiDAR apparatus may include a plurality of light source arrays LA1 and LA5 each including a plurality of light sources arranged in a vertical direction. Although only two light source arrays LA1 and LA5 are illustrated in FIG. 19, light source arrays may be arranged within a plurality of angle sections obtained by dividing an angle range of 180 degrees or more in the circumferential direction at equal intervals, respectively. For example, when the second mirror array 120 has a truncated square pyramid shape, five light source arrays may be sequentially arranged in the circumferential direction at intervals of 45 degrees within an angle range of 225 degrees.

The first light source array LA1 may include a support SP1 extending in a vertical direction and the plurality of light sources LD11, LD12, and LD13 fixed to the support SP1 and arranged in the vertical direction. Likewise, the fifth light source array LA5 may also include a support SP5 extending in a vertical direction and the plurality of light sources LD51, LD52, and LD53 fixed to the support SP5 and arranged in the vertical direction. The plurality of light sources LD11, LD12, and LD13 and LD51, LD52, and LD53 may be, for example, vertical cavity surface emitting laser (VCSEL), and may be arranged to emit light in a horizontal direction. Light emitted from the plurality of light sources LD11, LD12, and LD13 and LD51, LD52, and LD53 becomes a parallel beam by a plurality of collimating lenses C11, C12, and C13 and C51, C52, and C53.

The LiDAR apparatus may also include a plurality of mirror arrays MA1 and MA5 each including a plurality of mirrors arranged in a parabolic shape in a vertical direction to face each of a plurality of light sources. Although only two mirror arrays MA1 and MA5 are illustrated in FIG. 19, each light source array may be arranged within a plurality of angle sections obtained by dividing an angle range of 180 degrees or more in the circumferential direction at equal intervals. For example, when the second mirror array 120 has a truncated square pyramid shape, five mirror arrays may be sequentially arranged in the circumferential direction at intervals of 45 degrees within an angle range of 225 degrees.

The first mirror array MA1 corresponds to the first light source array LA1. The first mirror array MA1 may include a plurality of mirrors M11, M12, and M13 respectively reflecting light emitted from the plurality of light sources LD11, LD12, and LD13 of the first light source array LA1 to the second mirror array 120. The plurality of mirrors M11, M12, and M13 may be arranged in a parabolic shape in a vertical direction. For example, a mirror arranged lower among the plurality of mirrors M11, M12, and M13 may be further away from a corresponding light source from among the plurality of light sources LD11, LD12, and LD13. In addition, the fifth mirror array MA5 corresponds to the fifth light source array LA5. The fifth mirror array MA5 may also include a plurality of mirrors M51, M52, and M53 respectively reflecting light emitted from the plurality of light sources LD51, LD52, and LD53 of the fifth light source array LA5 to the second mirror array 120. An incident angle of light incident on the second mirror array 120 may be multiplexed by the plurality of mirrors M11, M12, and M13 and M51, M52, and M53.

Figure 20:
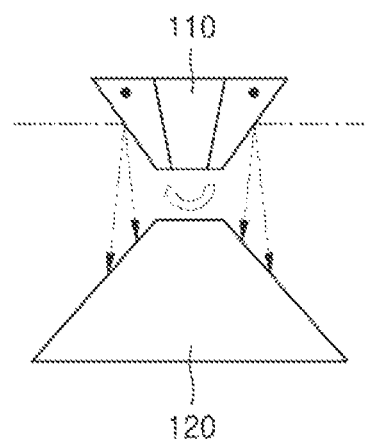
FIG. 20 is a view of a configuration in which light reflected by a plurality of inclined mirrors of a first mirror array is incident on different positions on a second mirror array according to an example embodiment.

When a plurality of inclined mirrors of the first mirror array 110 have different inclination angles, light reflected by different inclined mirrors of the first mirror array 110 may be incident on different positions of the second mirror array 120. FIG. 20 exemplarily shows a configuration in which light reflected by a plurality of inclined mirrors of the first mirror array 110 is incident on different positions on the second mirror array 120. Referring to FIG. 20, as the first mirror array 110 or the second mirror array 120 rotates, light reflected by different inclined mirrors of the first mirror array 110 is sequentially incident on the second mirror array 120. However, when inclination angles of the inclined mirrors are different from each other, light is incident on different positions on the second mirror array 120. In this case, an area where transmission light is incident and an area where received light is incident may overlap on an inclined mirror of the second mirror array 120. This phenomenon, as shown in FIG. 20, may occur when positions of light incident points on the plurality of inclined mirrors of the first mirror array 110 in a radial direction are kept constant while the first mirror array 110 rotates.

Figure 21:
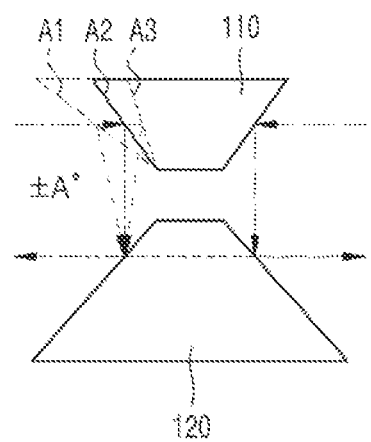
FIG. 21 is a view of a configuration in which light reflected by a plurality of inclined mirrors of a first mirror array is incident at the same position on a second mirror array according to an example embodiment.

Therefore, positions of reflective surfaces of the plurality of inclined mirrors of the first mirror array 110 in the radial direction may be different from each other such that light emitted from the same light source and light reflected by the plurality of inclined mirrors of the first mirror array 110 is incident at the same position on the second mirror array 120. FIG. 21 exemplarily shows a configuration in which light reflected by a plurality of inclined mirrors of the first mirror array 110 is incident at the same position on the second mirror array 120. Referring to FIG. 21, positions of light incident points on the plurality of inclined mirrors A1, A2, and A3 of the first mirror array 110 in a radial direction may be different from each other. In addition, inclination angles of the plurality of inclined mirrors A1, A2, and A3 may be set such that light is incident at the same position on the second mirror array 120. Then, while the first mirror array 110 or the second mirror array 120 is rotating, positions where light is incident on the plurality of inclined mirrors of the second mirror array 120 may be kept constant.

Figure 22:
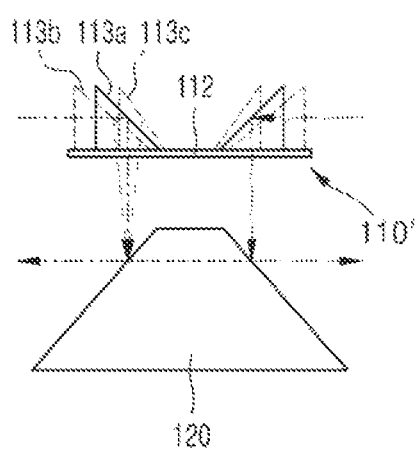
FIG. 22 is a view of a configuration of a first mirror array according to another example embodiment.

FIG. 22 is a view of a configuration of a first mirror array 110' according to another example embodiment. Referring to FIG. 22, a plurality of inclined mirrors of the first mirror array 110' may include a plurality of right angle prisms 113a, 113b, and 113c. The first mirror array 110' may further include a support plate 112 supporting the plurality of right angle prisms 113a, 113b, and 113c. In this case, the first mirror array 110' may not be a polygon mirror. The plurality of right angle prisms 113a, 113b, and 113c may have the same height and different lengths of the bases. Accordingly, the plurality of right angle prisms 113a, 113b, and 113c may have different inclination angles. In addition, positions of light incident points on the plurality of right angle prisms 113a, 113b, and 113c in a radial direction may be different from each other. As described with reference to FIG. 21, the inclination angles of the plurality of prisms 113a, 113b, and 113c may be set such that light is incident at the same position on the second mirror array 120.

Figure 23:
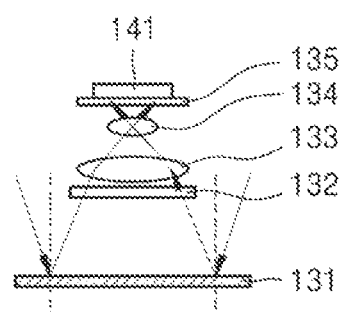
FIG. 23 is a cross-sectional view of a configuration of a light-receiving unit according to another example embodiment.

FIG. 23 is a cross-sectional view of a configuration of a light-receiving unit according to another example embodiment. In a case of the light-receiving unit shown in FIG. 2, it has been described that the photodetector 140 is on a focal point formed by the concave mirror 130 and the lens 133. In this case, because light is incident on the photodetector 140 from all directions, noise may increase. The light-receiving unit illustrated in FIG. 23 may sequentially include the concave mirror 130 (see FIG. 1), the flat mirror 131, the band pass filter 132, two lenses 133 and 134, a mask 135, and a photodetector array 141 in a light traveling direction of light. The lens 134 may be on a focal point formed by the concave mirror 130 and the lens 133, and the photodetector array 141 may be on a focal point of the lens 134. In this case, light incident on the second mirror array 120 from different directions may reach different positions on the photodetector array 141.

FIG. 23 illustrates that the flat mirror 131 is used as a mirror that reflects light from the concave mirror 130 to the photodetector 140, but is not limited thereto. For example, in order to increase or decrease an effective focus of the concave mirror 130, a convex mirror or a concave mirror may be arranged at the position of the flat mirror 131 instead of the flat mirror 131.

Figure 24:
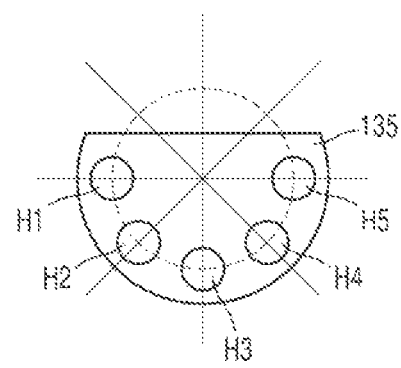
FIG. 24 is a view of a structure of a mask of the light-receiving unit shown in FIG. 23 according to an example embodiment.

FIG. 24 shows an exemplary structure of the mask 135 of the light-receiving unit illustrated in FIG. 23. The mask 135 suppresses noise by limiting light incident on the photodetector array 141. To this end, the mask 135 may include a plurality of openings through which light passes. For example, when the second mirror array 120 has a truncated square pyramid shape and five light sources are sequentially arranged in the circumferential direction at intervals of 45 degrees, the mask 135 may include five openings H1, H2, H3, H4, and H5 sequentially arranged in the circumferential direction at intervals of 45 degrees. The number and positions of a plurality of openings arranged in the mask 135 are not limited thereto, and may vary according to the number and positions of light sources.

Figure 25:
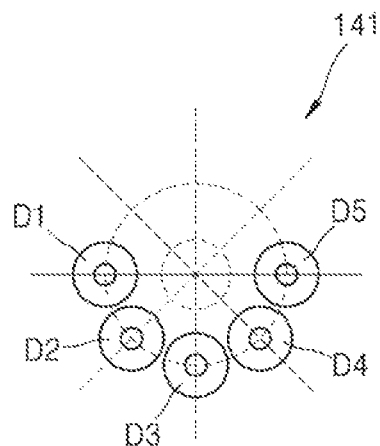
FIG. 25 is a view of a configuration of a photodetector array shown in FIG. 23 according to an example embodiment.

In addition, FIG. 25 shows an exemplary configuration of the photodetector array 141 shown in FIG. 23. Referring to FIG. 25, the photodetector array 141 may include a plurality of photodetectors arranged at regular intervals in a circumferential direction around a central optical axis. For example, when the second mirror array 120 has a truncated square pyramid shape and five light sources are sequentially arranged in the circumferential direction at intervals of 45 degrees, the photodetector array 141 may include five photodetectors D1, D2, D3, D4, and D5 that are sequentially arranged in the circumferential direction at intervals of 45 degrees. The number and positions of a plurality of photodetectors arranged in the photodetector array 141 are not limited thereto, and may vary according to the number and positions of light sources. The number of photodetectors of the photodetector array 141 may be the same as the number of light sources, and the arrangement of the photodetectors may be similar to the arrangement of light.

The mask 135 is disposed on a light-receiving surface of the photodetector array 141, and the openings H1, H2, H3, H4, and H5 of the mask 135 may correspond to the plurality of photodetectors D1, D2, D3, D4, and D5 of the photodetector array 141, respectively. Accordingly, light passing through the openings H1, H2, H3, H4, and H5 of the mask 135 may be incident on the corresponding photodetectors D1, D2, D3, D4, and D5 of the photodetector array 141.

Further, light emitted from a plurality of light sources through the second mirror array 120, after being reflected by an external object, may pass through the corresponding openings H1, H2, H3, H4, and H5 of the mask 135 and may be incident on the corresponding photodetectors D1, D2, D3, D4, and D5 of the photodetector array 141. Accordingly, it is possible to reduce noise and improve a signal-to-noise ratio by limiting ambient light.

Figure 26:
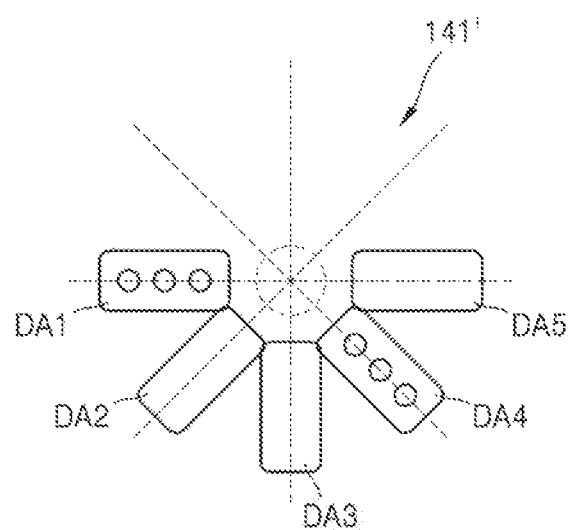
FIG. 26 is a view of a configuration of a photodetector array of a light-receiving unit according to another example embodiment.

FIG. 26 is a view of a configuration of a photodetector array 141' of a light-receiving unit according to another example embodiment. Referring to FIG. 26, the photodetector array 141' may include a plurality of one-dimensional sensor arrays DA1, DA2, DA3, DA4, and DA5 arranged at regular intervals in a circumferential direction around a central optical axis and extending in a radial direction. As shown in FIG. 14 and the like, when the plurality of light sources LD11, LD12, and LD13 are arranged in the radial direction within one angle section in an azimuth direction, each of the one-dimensional sensor arrays DA1, DA2, DA3, DA4, and DA5 may detect light emitted by incident on the second mirror array 120 at a plurality of different inclination angles from the plurality of light sources LD11, LD12, and LD13 arranged within a corresponding angle section.

According to the above-described example embodiments, in the azimuth direction, transmitters are configured within a plurality of angle sections in which an angle range of 180 degrees or more is divided in equal intervals, and light emitted from each transmitter is scanned by the first mirror array 110 and the second mirror array 120 within a corresponding angle section. Therefore, a horizontal viewing angle of 180 degrees or more may be secured. For example, a viewing angle in the azimuth direction may be about 180 degrees to about 270 degrees. In addition, because scanning is performed individually within a relatively narrow angle section, the influence of tilting of a beam passing through the first mirror array 110 and geometric distortion of a beam due to rotation of the second mirror array 120 may be minimized.

In addition, according to the disclosed example embodiment, in an elevation angle direction, the number of vertical channels may be greatly increased because a plurality of vertical channels are formed by multiplexing an inclination angle of a light source within each angle section and a combination of a plurality of inclined mirrors of the first mirror array 110 and a plurality of inclined mirrors of the second mirror array 120. Accordingly, a vertical viewing angle of 30 degrees or more may be secured. For example, a viewing angle in the elevation angle direction may be about 30 degrees to about 60 degrees.

According to the above-described example embodiments, while increasing a viewing angle in an azimuth direction and an elevation angle direction, a high frame rate of about 20 Hz or more may be achieved only by controlling rotation speeds of the first mirror array 110 and the second mirror array 120.

Because the LiDAR apparatus according to the example embodiments has a horizontal viewing angle and a vertical viewing angle that are wide, the LiDAR apparatus may accurately detect objects not only in front but also on the side, and may detect a three-dimensional state of the ceiling or floor in detail.

Such a LiDAR apparatus, for example, may be mounted on a vehicle and configured to extract distance and relative speed information with vehicles in front. However, the LiDAR apparatuses according to the above-described example embodiments are not necessarily applicable only to a vehicle. For example, in addition to vehicles, the LiDAR apparatuses may be mounted on ships, aircraft, or drones, and used to search for and avoid obstacles in front of the ships, aircraft, and drones. Furthermore, the above-described LiDAR apparatus may be used as an autonomous driving robot for factory automation, a stationary sensor for security, or a purpose for obtaining 3D information about an object that is installed on the side of a road and passes through the road.

Although the above-described LiDAR apparatus having a wide-viewing angle has been described with reference to the example embodiments shown in the drawings, they are only examples. Descriptions of features or aspects within each example embodiment should typically be considered as available for other similar features or aspects in other embodiments. It should be understood that example embodiments described herein should be considered in a descriptive sense only and not for purposes of limitation. The scope of rights is indicated in the claims rather than the above description, and all differences within the scope of equivalents should be construed as being included in the scope of rights.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LiDAR) apparatus comprising:
    a first rotatable mirror array configured to rotate with respect to a rotation axis, the first rotatable mirror array including a first plurality of inclined mirrors arranged in a circumferential direction;
    a plurality of light sources configured to emit light toward the first rotatable mirror array;
    a second rotatable mirror array configured to rotate with respect to the rotation axis, the second rotatable mirror array including a second plurality of inclined mirrors arranged in the circumferential direction, the second rotatable mirror array facing the first rotatable mirror array to reflect the light reflected by the first rotatable mirror array to an outside of the LiDAR apparatus; and
    a photodetector configured to detect the light reflected by the second rotatable mirror array,
    wherein the plurality of light sources are provided in a plurality of sections into which an angle range of 180 degrees or more is divided in equal intervals in the circumferential direction, and
    wherein the first mirror array is provided between the second mirror array and the photodetector in an axial direction of the rotation axis.

2. The LiDAR apparatus of claim 1, wherein the first rotatable mirror array and the second rotatable mirror array are configured to rotate about a same axis.

3. The LiDAR apparatus of claim 1, wherein a number of the first plurality of inclined mirrors of the first rotatable mirror array is a multiple of a number of the second plurality of inclined mirrors of the second rotatable mirror array.

4. The LiDAR apparatus of claim 1, wherein the second plurality of inclined mirrors of the second rotatable mirror array have different inclination angles.

5. The LiDAR apparatus of claim 4, wherein at least a portion of the first plurality of inclined mirrors of the first rotatable mirror array have different inclination angles.

6. The LiDAR apparatus of claim 5, wherein at least two inclined mirrors of the first plurality of inclined mirrors of the first rotatable mirror array have a same inclination angle.

7. The LiDAR apparatus of claim 6, wherein the at least two inclined mirrors having the same inclination angle face each other, from among the first plurality of inclined mirrors of the first rotatable mirror array.

8. The LiDAR apparatus of claim 6, wherein a number of scanning channels of the LiDAR apparatus in an elevation angle direction is a product of a number of inclination angles of the first plurality of inclined mirrors of the first rotatable mirror array and a number of inclination angles of the second plurality of inclined mirrors of the second rotatable mirror array.

9. The LiDAR apparatus of claim 1, wherein an angle between two adjacent light sources from among the plurality of light sources is half of an angle between two adjacent inclined mirrors from among the second plurality of inclined mirrors of the second rotatable mirror array.

10. The LiDAR apparatus of claim 1, wherein the second plurality of inclined mirrors of the second rotatable mirror array include a first inclined mirror having a first inclination angle, a second inclined mirror having a second inclination angle, a third inclination mirror having a third inclination angle, and a fourth inclined mirror having a fourth inclination angle, and the first, second, third, and fourth inclination angles are different from each other.

11. The LiDAR apparatus of claim 10, wherein the plurality of light sources includes a first light source, a second light source, a third light source, a fourth light source, and a fifth light source that are sequentially arranged at intervals of 45 degrees within an angle range of 225 degrees in the circumferential direction.

12. The LiDAR apparatus of claim 11, wherein, while the second rotatable mirror array is rotating,
    in a first mode in which the first light source, the third light source, and the fifth light source face any one of the first, second, third, and fourth inclined mirrors of the second rotatable mirror array, the first light source, the third light source, and the fifth light source sequentially emit the light, and
    in a second mode in which the second light source and the fourth light source face any one of the first, second, third, and fourth inclined mirrors of the second rotatable mirror array, the second light source and the fourth light source sequentially emit the light.

13. The LiDAR apparatus of claim 10, wherein the first plurality of inclined mirrors of the first rotatable mirror array include a fifth inclined mirror having a fifth inclination angle, a sixth inclined mirror having a sixth inclination angle, a seventh inclined mirror having a seventh inclination angle, an eighth inclined mirror having a eighth inclination angle, a ninth inclined mirror having the fifth inclination angle, a tenth inclined mirror having the sixth inclination angle, an eleventh inclined mirror having the seventh inclination angle, and a twelfth inclined mirror having the eighth inclination angle, and the fifth, sixth, seventh, and eighth inclination angles are different from each other.

14. The LiDAR apparatus of claim 13, wherein the second rotatable mirror array is configured to continuously rotate, and the first rotatable mirror array is configured to rotate in a stepwise manner by 45 degrees.

15. The LiDAR apparatus of claim 14, wherein, while the first rotatable mirror array is stopped, the second rotatable mirror array is configured to rotate by 360 degrees, and while the first rotatable mirror array rotates by one step, the second rotatable mirror array is configured to rotate by 90 degrees.

16. The LiDAR apparatus of claim 1, further comprising:
    a plurality of intermediate mirrors provided in the plurality of sections to reflect the light emitted from the plurality of light sources to the first rotatable mirror array.

17. The LiDAR apparatus of claim 16, wherein multiple light sources of the plurality of light sources are arranged in a radial direction within each section of the plurality of sections.

18. The LiDAR apparatus of claim 17, wherein the multiple light sources arranged in the radial direction within each section are tilted at different angles.

19. The LiDAR apparatus of claim 17, further comprising:
    a plurality of wedge prisms, each of the plurality of wedge prisms being configured to change a light traveling direction of the light, which is emitted from the multiple light sources arranged in the radial direction within each section, to be incident on a corresponding intermediate mirror at different angles.

20. The LiDAR apparatus of claim 17, wherein a number of scanning channels of the LiDAR apparatus in an elevation angle direction is a product of a number of the multiple light sources arranged in the radial direction within each section of the plurality of sections, the number of inclination angles of the first plurality of inclined mirrors of the first rotatable mirror array, and the number of inclination angles of the second plurality of inclined mirrors of the second rotatable mirror array.

21. The LiDAR apparatus of claim 16, wherein each of the plurality of intermediate mirrors includes a reflective surface of which an inclination angle is adjusted by electrical control.

22. The LiDAR apparatus of claim 1, wherein the first plurality of inclined mirrors of the first rotatable mirror array have different radial positions of reflective surfaces such that the light emitted from a same light source, among the plurality of light sources, and the light reflected by the first plurality of inclined mirrors of the first rotatable mirror array are incident at a same position on the second rotatable mirror array.

23. The LiDAR apparatus of claim 22, wherein the first plurality of inclined mirrors of the first rotatable mirror array are a plurality of right angle prisms having an inclined surface, and the plurality of right angle prisms have a same height and different base lengths.

24. The LiDAR apparatus of claim 1, wherein a viewing angle in an azimuth direction is about 180 degrees to about 270 degrees, and a viewing angle in an elevation angle direction is about 30 degrees to about 60 degrees.

25. The LiDAR apparatus of claim 1, further comprising:
a concave mirror reflecting the light reflected by the second rotatable mirror array and converging the light on a focal point.

26. The LiDAR apparatus of claim 25, wherein the photodetector is on the focal point of the concave mirror.

27. The LiDAR apparatus of claim 26, further comprising:
a flat mirror that extends an optical path between the concave mirror and the photodetector by reflecting the light reflected by the concave mirror toward the photodetector;
a band pass filter provided between the flat mirror and the photodetector, the band pass filter being configured to transmit only the light in an emission wavelength band of the plurality of light sources; and
a lens that focuses the light on the photodetector.

28. The LiDAR apparatus of claim 25, further comprising a plurality of photodetectors comprising the photodetector, the plurality of photodetectors being arranged in the circumferential direction.

29. The LiDAR apparatus of claim 28, wherein a number of the plurality of photodetectors is equal to a number of the plurality of light sources.

30. The LiDAR apparatus of claim 29, further comprising:
a mask provided on a light-receiving surface of the photodetector and having a plurality of openings corresponding to the plurality of photodetectors.

31. The LiDAR apparatus of claim 28, wherein each of the plurality of photodetectors is a one-dimensional sensor array extending in a radial direction.

32. A light detection and ranging (LiDAR) apparatus comprising:
a plurality of light source arrays, each of the plurality of light source arrays including a plurality of light sources arranged in a vertical direction;
a plurality of first mirror arrays, each of plurality of first mirror arrays including a plurality of mirrors arranged to have a parabolic shape in the vertical direction, the plurality of mirrors respectively facing the plurality of light sources;
a second rotatable mirror array including a plurality of inclined mirrors arranged in a circumferential direction and configured to reflect light reflected by the plurality of first mirror arrays to an outside of the LiDAR apparatus; and
a photodetector configured to detect the light that is reflected by the second rotatable mirror array after being incident onto the second rotatable mirror array from the outside of the LiDAR apparatus,
wherein the plurality of light source arrays and the plurality of first mirror arrays are respectively provided within a plurality of sections into which an angle range of 180 degrees or more in the circumferential direction is divided in equal intervals.

33. A light detection and ranging (LiDAR) apparatus comprising:
a plurality of light sources configured to emit light;
a photodetector configured to detect the light;
a first mirror array that has a first truncated pyramid shape, the first mirror array being configured to rotate with respect to a rotation axis and to reflect the light incident from the plurality of light sources; and
a second mirror array that has a second truncated pyramid shape and opposes the first mirror array in a vertical direction of the LiDAR apparatus, the second mirror array being configured to rotate with respect to the rotation axis and reflect the light that is incident from the first mirror array, to an outside of the LiDAR apparatus, and reflect the light incident from the outside of the LiDAR apparatus so that the light travels to the photodetector,
wherein the first mirror array is provided between the second mirror array and the photodetector in the vertical direction of the LiDAR apparatus, and
wherein the plurality of light sources are arranged along a circumference of a horizontal plane of the LiDAR apparatus which is perpendicular to an axial direction of the rotation axis.

34. The LiDAR apparatus of claim 33, wherein the plurality of light sources are arranged in an angle range of 180 degrees or more along the circumference of the horizontal plane of the LiDAR apparatus.

35. The LiDAR apparatus of claim 33, wherein the first mirror array is configured to continuously rotate, and the second mirror array is configured to rotate discretely.

* * * * *